United States Patent
Manoria et al.

(10) Patent No.: US 10,516,902 B1
(45) Date of Patent: Dec. 24, 2019

(54) CONTROL OF CONTENT BROADCASTING

(71) Applicant: International Business Machines Corporation, Armonk, NY (US)

(72) Inventors: Vikas K. Manoria, Bangalore (IN); Sivakumar Avkd, Visakhapatnam (IN); Prasad Velagapudi, Visakhapatnam (IN); Praveen B. Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/045,983

(22) Filed: Jul. 26, 2018

(51) Int. Cl.
   *H04N 21/2343* (2011.01)
   *H04N 21/266* (2011.01)
   *G06F 16/735* (2019.01)

(52) U.S. Cl.
   CPC ....... *H04N 21/2343* (2013.01); *G06F 16/735* (2019.01); *H04N 21/266* (2013.01)

(58) Field of Classification Search
   CPC . H04N 21/2343; H04N 21/266; G06F 16/735
   See application file for complete search history.

(56) References Cited

U.S. PATENT DOCUMENTS

| | | | |
|---|---|---|---|
| 5,913,013 A * | 6/1999 | Abecassis | A63F 13/10 386/261 |
| 7,640,272 B2 | 12/2009 | Mahajan et al. | |
| 8,458,046 B2 | 6/2013 | Myslinski | |
| 9,361,353 B1 * | 6/2016 | Aristides | G06F 16/735 |
| 2007/0011699 A1 | 1/2007 | Kopra et al. | |
| 2007/0124395 A1 | 5/2007 | Edge et al. | |
| 2010/0312628 A1 | 12/2010 | Reid | |
| 2011/0067044 A1 | 3/2011 | Albo | |
| 2011/0264699 A1 | 10/2011 | Antonelli et al. | |
| 2011/0295607 A1 | 12/2011 | Krishnan et al. | |

(Continued)

FOREIGN PATENT DOCUMENTS

| | | |
|---|---|---|
| CN | 103914530 A | 7/2014 |
| CN | 105163179 A | 12/2015 |

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Sumaiya A Chowdhury
(74) *Attorney, Agent, or Firm* — Law Office of Jim Boice (57) ABSTRACT

A method adjusts a broadcasting system according to properties of content being broadcast. One or more processors receive a proposed content that is designed to be a component of an electronic broadcast by a broadcast system. The processor(s) determine a broadcast analysis pattern (BAP) for the proposed content, where the BAP describes the proposed content and an intended target of the electronic broadcast. The processor(s) retrieve a set of rules that describe a tone and format for particular content that is broadcast to the intended target, and determine whether the proposed content conforms to the set of rules. In response to determining that the proposed content does not conform to the set of rules, the processor(s) adjust the broadcasting system, where adjusting the broadcasting system modifies how content is broadcast to the intended target.

9 Claims, 7 Drawing Sheets

(56) References Cited

U.S. PATENT DOCUMENTS

| | | |
|---|---|---|
| 2013/0298151 A1 | 11/2013 | Leske et al. |
| 2014/0092990 A1* | 4/2014 | Vuskovic .......... H04N 21/2743 |
| | | 375/240.26 |
| 2014/0330760 A1 | 11/2014 | Meier et al. |
| 2016/0028681 A1 | 1/2016 | Freire et al. |
| 2017/0013127 A1 | 1/2017 | Xue et al. |

OTHER PUBLICATIONS

UN Global Pulse, "Public Radio Content Analysis Tool", Big Data Tools Series No. 1, <https://www.unglobalpulse.org/projects/radio-mining-uganda>, 2016, pp. 1-2.

J. Macnamara, "Media Content Analysis: Its Uses; Benefits and Best Practice Methodology", Asia Pacific Public Relations Journal, 6(1), 2005, pp. 1-34.

A. Vishwanath, "SC Asks Government to Consider Allowing Private Radio Stations to Broadcast News", www.livemint.com, Feb. 15, 2017, pp. 1-2.

* cited by examiner

CONTROL OF CONTENT BROADCASTING

BACKGROUND

The present invention relates to the field of broadcasting systems, and particularly to broadcasting systems that broadcast content of a certain standard. Still more particularly, the present invention relates to controlling the content of the broadcasting systems.

SUMMARY

In one or more embodiments of the present invention, a method adjusts a broadcasting system according to properties of content being broadcast. One or more processors receive a proposed content that is designed to be a component of an electronic broadcast by a broadcast system. The processor(s) determine a broadcast analysis pattern (BAP) for the proposed content, where the BAP describes the proposed content and an intended target of the electronic broadcast. The processor(s) retrieve a set of rules that describe a tone and format for particular content that is broadcast to the intended target, and determine whether the proposed content conforms to the set of rules. In response to determining that the proposed content does not conform to the set of rules, the processor(s) adjust the broadcasting system, where adjusting the broadcasting system modifies how content is broadcast to the intended target.

In one or more embodiments, the method described above is implemented as a computer program product and/or a computer system.

DETAILED DESCRIPTION

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also be stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

Figure 1:
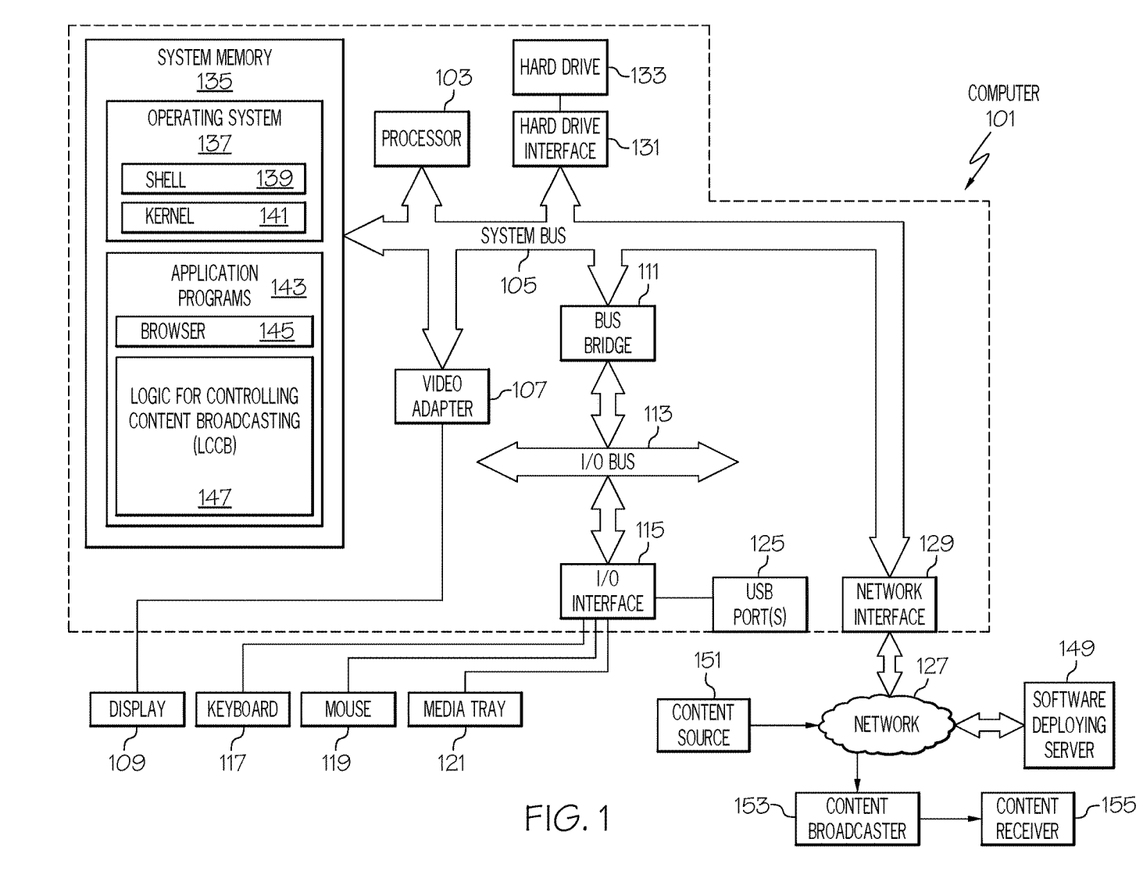
FIG. 1 depicts an exemplary system and network in which the present disclosure is implemented in one or more embodiments.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 utilized by software deploying server 149 and/or a content source 151 and/or content broadcaster 153 and/or content receiver 155 shown in FIG. 1, and/or content selector device 303 shown in FIG. 3.

In one or more embodiments of the present invention, exemplary computer 101 includes a processor 103 that is coupled to a system bus 105. Processor 103 utilizes one or more processors, each of which has one or more processor cores. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. While the format of the ports connected to I/O interface 115 is that which is known to those skilled in the art of computer architecture, including by not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc. A such, computer 101 and/or content source 151 and/or content broadcaster 153 and/or content receiver 155 are devices capable of transmitting and/or receiving wireless and/or Internet broadcasts, such as private/public channel radio or television broadcasts, streaming broadcasts, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Logic for Controlling Content Broadcasting (LCCB) 147. LCCB 147 includes code for implementing the processes described below, including those described in FIGS. 2-5. In one embodiment, computer 101 is able to download LCCB 147 from software deploying server 149, including in an on-demand basis, wherein the code in LCCB 147 is not downloaded until needed for execution. In one embodiment of the present invention, software deploying server 149 performs all of the functions associated with the present invention (including execution of LCCB 147), thus freeing computer 101 from having to use its own internal computing resources to execute LCCB 147.

The hardware elements depicted in computer 101 are not intended to be exhaustive, but rather are representative to highlight essential components required by the present invention. For instance, in one or more embodiments computer 101 includes alternate memory storage devices such as magnetic cassettes, digital versatile disks (DVDs), Bernoulli cartridges, and the like. These and other variations are intended to be within the spirit and scope of the present invention.

Radio and television stations (government owned, private, community, Internet-based streaming stations) broadcast news, and run many kinds of informative and entertainment programs for the public. These programs can be live programs or recorded broadcast. In the prior art, recorded content gets reviewed by internal content specialists before broadcast. These specialists are focused on audio quality, background noise, and the speaker's voice rather than actual content quality. In the case of either a live broadcast program or a pre-recorded broadcast program, there is no such process in the prior art for checking content quality before it is broadcast in an objective manner. That is, any content quality checking is subjective at best, and inconsistent at worst. Furthermore, the prior art and existing technology systems are unable to selectively determine not only which content is to be broadcast, but are also unable to selectively determine a particular channel for broadcasting content based on a broadcast analysis pattern, sensitivity issues, trustworthiness, and/or conformance to a rules-based model for broadcast content.

Broadcasters need to be cautious and sensitive about the quality of content getting broadcasted to the public. On one hand, not only do broadcasters require that their broadcast content to be free from bias, unreasonable violence, cruelty, and defamatory views, but they also require their broadcast content to be relevant, valuable, entertaining, and current.

Broadcast channels (radio, television, cable, Internet-based streaming, etc.) also need effective ways to continuously improve the quality of content. The present invention provides a method and system that solves this problem without use of surveys and other forms of direct user feedback. Rather, the present invention is based on a natural language processing (NLP) based content analysis, which is used in 1) identifying the tone/context of the content, 2) determining appropriateness of content for target audience, and 3) activating a proper channel for broadcasting the content. In one or more embodiments, the present invention utilizes a rule-based model for the content that is deemed appropriate for a particular audience.

In an embodiment of the present invention, a domain based content enrichment analysis is performed. In an embodiment of the present invention, the content enrichment analysis is based on content that is enriched using emotions identified in the content. In an embodiment of the present invention, various socially sensitive issues are identified during content analysis and a Social Sensitivity Index (SSI) value is calculated. In an embodiment of the present invention, a Trustworthiness Index (TI) value is calculated by identifying a level of bias, accuracy and completeness in the content. In an embodiment of the present invention, a Guidelines Conformance Index (GCI) value is calculated for the content.

While the present invention is intended for use by any broadcast medium (radio, television, Internet streaming, private cable transmission, etc.), the features of the present invention will be primarily described in the context of a radio broadcast or live and/or recorded content.

As an overview, one or more embodiments of the present invention take in selected/all broadcasted radio programs from selected/all radio stations in a real-time basis. One or more embodiments of the present invention determine an objective and domain of the broadcasted program, the target audience type, the broadcast region, the time-slot of the broadcast, etc. One or more embodiments of the present invention analyze the broadcast content using rule-sets for known higher level sensitivities and identify deviations/violations of the rule-sets, if any.

In one or more embodiments of the present invention, the content is enriched with descriptions of tone, emotions, sentiment, and domain based compliance taxonomy for processing and analysis.

In order to determine the tone of the content, a tone analyzer analyzes the text of the content at the document level and the sentence level. The document level analysis provides an overall tone (angry, fearful, happy, sad, confident, tentative, etc.) of the document, while the sentence level identifies specific areas in the content that show the highest level of emotion.

Sentiment is essentially whether the content is supporting a particular position, is against a particular position, or is neutral (indifferent) on a particular position. The overall sentiment is established using natural language processing (NLP) that determines the context and meaning of the content.

The domain based compliance taxonomy is identified using a word search for certain terms, which may be in violation of rules of an enterprise.

Figure 2:
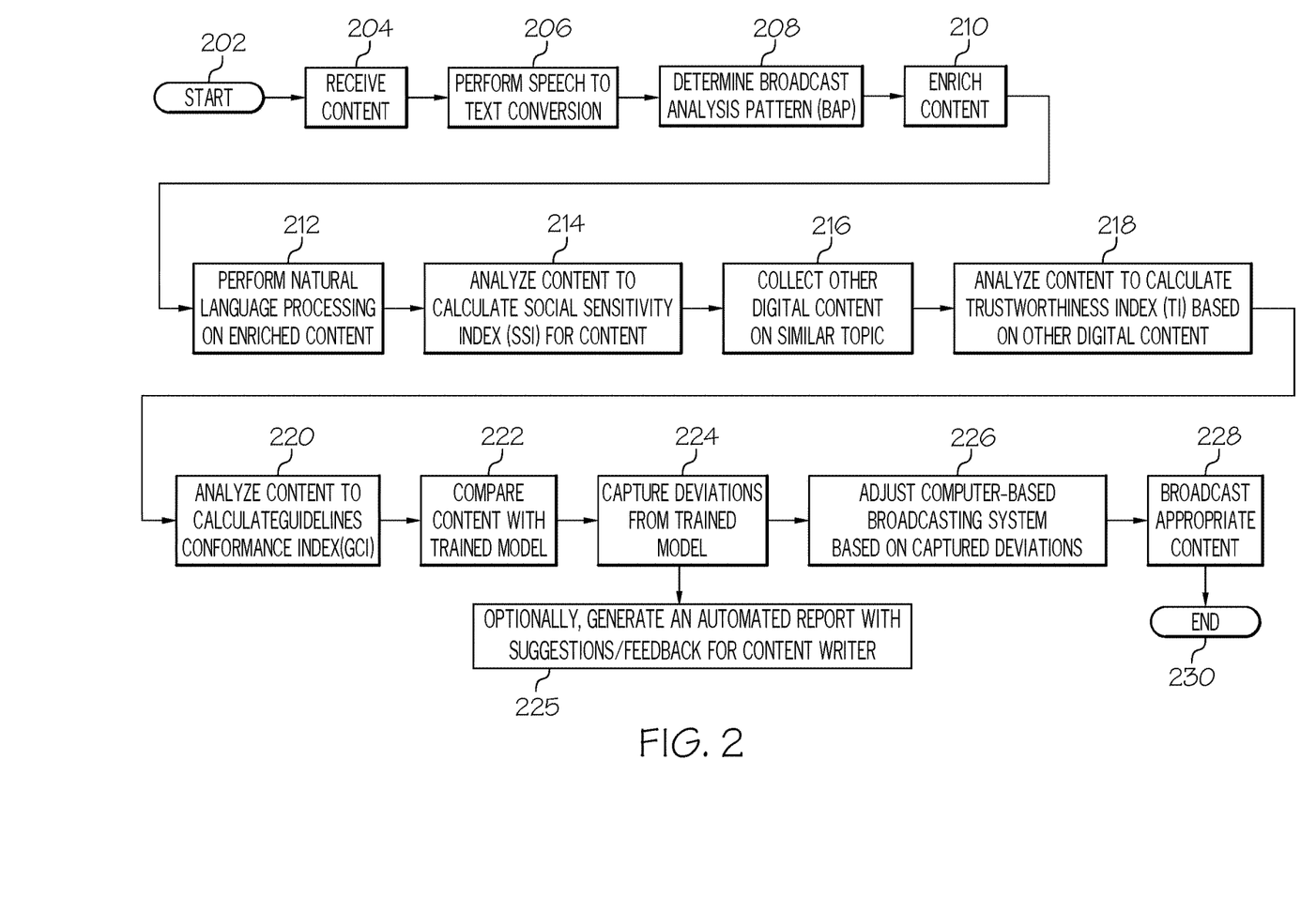
FIG. 2 is a high-level flow depicting one or more embodiments of the present invention.

The system then generates a weighting for each of these factors (tone, sentiment, taxonomy), which are then applied to the attributes associated with the context in order to more accurately evaluate the received content (as described in blocks 208-214 in FIG. 2).

In one or more embodiments of the present invention, major communities and their content related sensitivities geography wise are identified. The content is analyzed against these social sensitivities of the geography where content is broadcasted.

In one or more embodiments of the present invention, a Social Sensitivity Index (SSI) value is calculated, and tagged to the content.

In one or more embodiments of the present invention, the trustworthiness of the content is checked by evaluating the level of bias, incompleteness and/or inaccuracy in the content. In one or more embodiments of the present invention, this checking is performed by comparing the content to be broadcast with news/articles from credible digital content providers, thus leading to a comparative analysis of the content in order to identify cases of bias, incompleteness and inaccuracy. In one or more embodiments of the present invention, a Trustworthiness Index (TI) value is calculated and tagged to the content.

In one or more embodiments of the present invention, guideline (internal, regulatory, etc.) conformance is determined. In one or more embodiments of the present invention, a system is trained using guideline/regulatory rules utilized by the broadcaster. In one or more embodiments of the present invention, a Guidelines Conformance Index (GCI) value is calculated in order to describe the content's extent of conformance. In one or more embodiments of the present invention, the content is tagged with the GCI value.

In one or more embodiments of the present invention, a computer-based broadcasting system is adjusted in order to broadcast appropriate content. In one or more embodiments of the present invention, the appropriateness of the content for broadcast is measured based on whether the content meets a threshold value of the SSI, TI, and/or GCI.

The present invention can be utilized with pre-recorded content or live content, assuming that there is a delay (between when the content is spoken and when it actually goes out on the airwaves) that is long enough for the present computer-based system to evaluate and control what content goes out on the airwaves.

With reference now to FIG. 2, a high-level flow-chart of one or more steps performed in the present invention is presented.

After initiator block 202, content is received by a computer (e.g., computer 101) shown in FIG. 1 from a content source (e.g., content source 151 shown in FIG. 1). In various embodiments of the present invention, this content source is either pre-recorded content or live content (assuming that there is a delay that is long enough between the content is received in block 204 and when the content is broadcast in block 228. In various embodiments of the present invention, the received content is text-based (in the case of a text-based broadcast), video-based (e.g., in the case of a television broadcast or an Internet streaming broadcast), and/or speech-based (e.g., spoken words on a radio, television, or Internet-based program, such as a podcast). If the content is speech-based, then a speech-to-text conversion is performed (see block 206) by recognizing an audio waveform as representing certain words/phrases, and then converting that audio waveform into a corresponding text for the represented words/phrases.

Once the content is determined to be (or else converted into) in text form, a Broadcast Analysis Pattern (BAP) is determined (see block 208). The BAP is determined by analyzing the initial content, the geographic area when the content is to be broadcast, a time-slot during which the content will be broadcast, and rules that are used to determine if the content is appropriate for a certain audience.

A "Broadcast Analysis pattern (BAP)" is based on one or more factors, including but not limited to: 1) a broad domain area of broadcasted media content (e.g., healthcare); 2) narrower topics under identified broader domain area (e.g., heart attacks as a narrower topic of healthcare); 3) geographies (i.e., geographic locations) and respective time zone where the content is to be broadcasted; 4) the targeted audience group; 5) the approved broadcast times and durations of the content for the geography associated with the targeted audience group (which times/durations/groups are continuously updated through the workflow based process depicted in FIG. 2); and 6) known legal/cultural/other sensitivities (regular expression based rule-sets) attached to the domain content, time-slot, geographies and audience group (which sensitivities are also updated during the workflow based process).

With reference now to block 210, the received content (i.e., the original/content received in block 204 after being converted into text, if necessary), is enriched with metatags that describe the tone, emotions and domain (as per BAP) of terms and phrases found in the received content. Based on the detected BAP, ingested/received content is analyzed with a respective trained domain specific machine-learning annotator, which understands content taxonomy with predefined terms, and data model elements (discussed below with reference to block 222). This trained domain specific machine-learning annotator discovers difficult to understand, domain specific abbreviation and phrases from the content and tags them with descriptive clauses and sentences, which makes content easy to understand, interpret and process through the next set of analysis phases. In an embodiment of the present invention, the ingested/received/ enriched content is analyzed by natural language processing (NLP), which determines the meaning/context of the enriched content. That is, the NLP processing depicted in block 212 analyzes both the words in the received content (see block 204) as well as the BAP metadata appended thereupon (see block 208). This resultant tagged content is then passed as input content to the next stages depicted in FIG. 2 for further analysis and processing.

As shown in block 214, the tagged input content is then analyzed to calculate a social sensitivity index (SSI) value, which describes the tagged input content's social acceptability in a particular geography. Social sensitivity is defined as the ability to perceive, understand, and respect the feelings and viewpoints of individuals, groups and overall society while sharing across any thought, message or point of view. Sometimes these viewpoints may be conflicting on various topics. While broadcasted content is enjoyed by one group it might hurt feelings of other groups, so striking a fine balance is the key requirement to remaining socially acceptable, compliant and relevant. SSI value gives program-wise crucial insights into broadcasted content to broadcasters, government and other stakeholders.

In order to calculate a SSI value (range 0-100%), one or more embodiments of the present invention 1) identify the target group (e.g., toddlers) in various geographies; 2) recognize group wise sensitive topics along with the acceptability levels e.g. Red (Unacceptable—0), Yellow (Caution—1), Green (Acceptable—2); 3) train a machine learning based Natural Language Annotation Model to detect the sensitivity and acceptability level from input content (tagged with tone, emotion and domain taxonomy) for various groups in a particular geography to create a social sensitivity detection model (SSDM); 4) run the input content against SSDM and aggregate the acceptability score for each sentence e.g. let us say there are 7 identified social groups (group 1, group2, . . . , group7) in a geography so for every unit of content (i.e. sentence) maximum acceptability value would be 2(acceptable)×7(groups)=14 and minimum 0(unacceptable)×7(groups)=0; 5) calculate the final SSI value in percentages e.g., for a content with 5 sentences whose SSI scores are 13, 8, 7, 3, 14=45. The overall SSI score for this content is (45/5)/14×100/14=~64% socially acceptable; 6) perform a quality related further analysis to determine if the 64% overall SSI value for a content is good or bad and which groups are getting ignored geographically, and to what extent; 7) further tagging the input content with SSI scores; and 8) passing the further SSI-tagged content to next stages shown in FIG. 2 for further analysis and processing.

With reference now to blocks 216 and 218, the tagged input content is analyzed in order to calculate a trustworthiness index (TI) value to describes the extent of incompleteness, bias, and inaccuracy of content.

While content can freely be inaccurate if it is clearly identified for the recipient as being fiction, if the content is non-fiction (e.g., a history program, new reporting, etc.), then it is assumed to be complete, non-biased, and accurate.

A TI value addresses this part of broadcasted content by 1) filtering the content to retrieve only for news or expert advice/comments (e.g., based on contextual analysis, metatags, a format/name of the broadcast, etc.); 2) identifying other credible and reputed digital news/research content providers, respected government or international bodies to source the quality news content from; 3) ingesting/receiving digital news/articles from aligned sources for matching input content text and finding the closest version to the current input content; 4) performing a comparison of content to see if the current ingested/received broadcasted content is complete; 5) generating a completeness level (e.g., between 0 and 1, such that 1 represents that the current content is complete and 0 represents that the current content is incomplete); 6) performing a comparison of the current/broadcasted content to the other (known and trustworthy) content to see if the current/broadcasted content is biased; 7) calculating an unbiased level of the current content (e.g., 1 if unbiased and 0 if biased); 8) performing a comparison of the current and trusted content to see if the current content is inaccurate; 9) assigning an accuracy level to the current content (e.g., 1 if accurate or 0 if inaccurate); 10) calculate the total TI value based on the calculated completeness level, unbiased level, and accuracy level according to the formula TI value=Completeness*x+Unbiased*y+Accuracy*z, where x, y and z are assigned weights to these three core expectations (irrespective of weights assigned to these variables, their total must be 100); 11) performing a further quality related analysis in order to determine if the calculated TI value for a content is good or bad and to what extent; and 12) further tagging the input/received content with the TI scores and passing (as input content) the further tagged content to next stages shown in FIG. 2 for further analysis and processing.

With reference to block 220, the tagged content (tagged with the BAP, SSI, and/or TI tags) is then analyzed to calculate a guidelines conformance index (GCI) value to measure content's extent of conformance with user-selected guidelines. That is, such guidelines are incorporated/selected by the user for determining whether content is appropriate for being broadcast to a certain target audience. In one embodiment of the present invention, these guidelines are based on governmental regulations and/or internal (i.e., user-created) guidelines. To calculate GCI, the following process is followed in one or more embodiments of the present invention. First, a machine learning based Natural Language Annotation Model creates a Guidelines Variations Detection Model (GVDM), which detects deviations from identified guidelines from input content against various parameters (i.e. governmental regulations, user defined best practices, copyright guidelines, etc.). The GVDM is then trained using guidelines documents and/or cases. Next, the GVDM is used to analyze content and calculate confidence level (between 0 to 100%) against selected parameters. In one or more embodiments, the GVDM is re-trained in case there are any changes in guidelines. Finally, an aggregated value, referred to herein as the GCI value, is created. In an embodiment of the present invention, the GCI value is calculated based on the formula GCI value=Regulation*x+Best-Practice*y+Copy-Right*z+ . . . , where x, y, z, . . . are assigned weightages to core elements/parameters. Irrespective of weightages assigned to these variables, their total must be 100.

The system is now ready to analyze input content (which in one or more embodiments is tagged with BAP indicators, tone and emotion metadata descriptors, SSI and TI scores, etc.) to determine if it is appropriate for broadcasting. As shown in block 222, in an embodiment of the present invention, the tagged content (tagged with BAP, SSI, TI, and/or GCI metatags) is compared to a trained model. This trained model depicts a model content whose BAP, SSI, TI, and/or GCI metatags have values that are within a user-defined level. The trained model has undergone a same process as described in blocks 204-218 in order to generate the BAP, SSI, TI, and/or GCI metatags. If the current content deviates beyond a predetermined range (based on the BAP, SSI, TI, and/or GCI metatags), as described in block 224, then the system adjusts a computer-based broadcasting system (see block 226). This adjustment to the broadcasting system is achieved in various manners in various embodiments of the present invention. As shown in block 225, in an embodiment of the present invention an automated report with suggestions/feedback for the content writer is generated and sent to the content writer. For example, the system may detect certain terms that an enterprise prefers not to use for broadcasts, since they may convey confidential information about the enterprise (e.g., research and development information), or potentially offensive language that the enterprise does not wish to be associated with. The system will then generate a report of terms/phrases that have the potential of exposing confidential information and/or using offensive language, and will 1) point out the problematic language in a report and/or 2) directly make changes to the content and have the problematic language removed.

Figure 3:
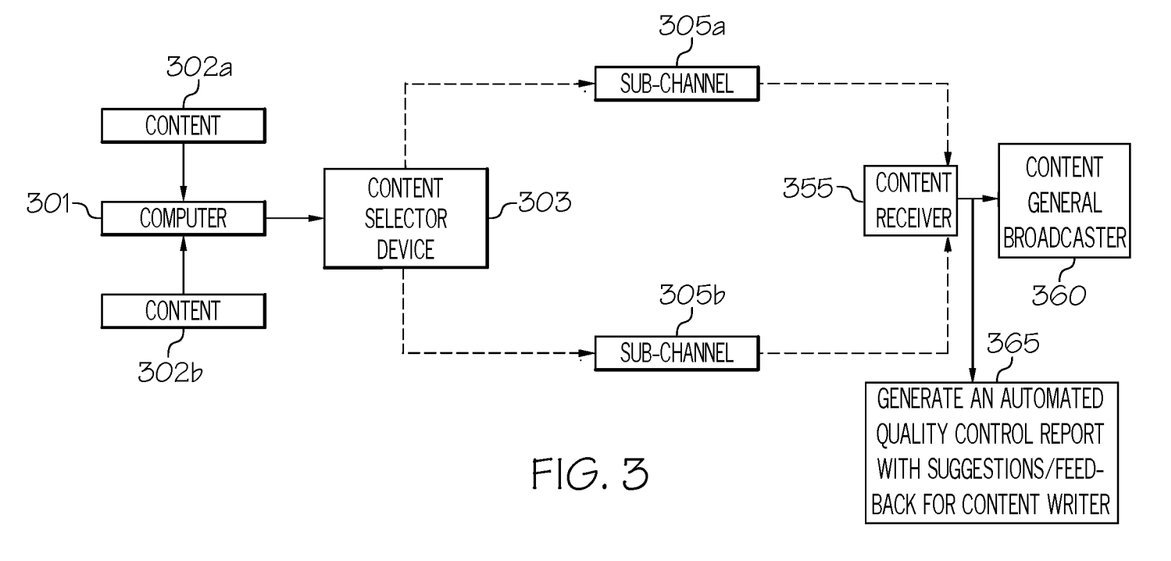
FIG. 3 illustrates a content selector device selectively activating a specific sub-channel for selected broadcast content in accordance with one or more embodiments of the present invention.

For example, and with reference to FIG. 3, assume that computer 301 (analogous to computer 101 shown in FIG. 1) has received two different contents (content 302a and content 302b) from content source 151. In various embodiments of the present invention, these contents are pre-recorded, and/or they are "live". For example and in various embodiments of the present invention, one or both contents are audio recordings that have been previously made and stored, while one or both are audio that is captured by a microphone in real time (assuming that there is a delay between when the real-time audio is captured by the microphone and when it is broadcast, in order to allow an analysis, such as that shown in FIG. 2, is allowed to be performed in order to determine which content is appropriate for the target audience).

As shown in FIG. 3, the computer 101 sends the multiple contents to a content selector device 303, which is a hardware channel selector. For purposes of illustration, assume that there are two contents in the multiple contents, depicted in FIG. 3 as content 302a and content 302b. Assume further that content selector device 303 is a switch that 1) is able to read metadata (the BAP, SSI, TI, and/or GCI metatags) that is attached to content 302a and content 302b; and 2) has internal logic (e.g., a switch-controlling logic) capable of activating a particular sub-channel to the content receiver 355 (analogous to content receiver 155 shown in FIG. 1). That is, content selector device 303 reads the BAP, SSI, TI, and/or GCI metatags that are attached to content 302a and content 302b; matches these readings to the types of content that have been predetermined to be appropriate for one (but not both) of the sub-channels 305a-305b; and activates the appropriate sub-channel from sub-channels 305a-305b to transmit the selected content from contents 302a-302b.

For example, assume that content 302a is a cartoon. Computer 301 has determined (e.g., generating the BAP, SSI, TI, and/or GCI metatags for content 302a using the process shown in FIG. 2) that the user of content receiver 355 is a child who is an appropriate recipient of this cartoon. Assume further that content 302b is a documentary film, and that computer 301 has determined (e.g., by generating the BAP, SSI, TI, and/or GCI metatags for content 302b using the process shown in FIG. 2) that the user of content receiver 355 is a child who is not an appropriate recipient of this documentary film. As such, the computer 301 will direct the content selector device 303 (or alternatively, the content selector device 303 determine on its own) to activate the sub-channel 305a while keeping the sub-channel 305b deactivated, such that the content 302a is sent via sub-channel 305a to the content receiver 355.

In one embodiment of the present invention, sub-channel 305a and sub-channel 305b are a same type of channel that is activated by content selector device 303. In another embodiment of the present invention, sub-channel 305a and sub-channel 305b are different types of channels. For example, assume that sub-channel 305a is a cable television channel and sub-channel 305b is an Internet (streaming) channel, both of which are capable of being used by the content receiver 355 (e.g., a "smart" television). Assume further that the cable television channel (sub-channel 305a) is reserved for children's programming, while the Internet channel (sub-channel 305b) is reserved for programming designed for an older audience. In this embodiment, the system reserves certain types of channels for content identified as being appropriate for a certain audience in a manner that is not provided for in the prior art.

In an embodiment of the present invention, the content receiver 355 is not the final recipient of the content. That is, in an embodiment of the present invention the content receiver 355 is an intermediate screener of the content, and sends the content (selected by content selector device 303) on to a content general broadcaster 360, such as a radio transmitter, a television transmitter, etc., which broadcasts the content to the general public (or at least a selected spectrum of the public). This embodiment allows the content to be further modified before being widely broadcast.

Thus, as shown in block 365, in an embodiment of the present invention an automated report with suggestions/feedback for the content writer is generated and sent to the content writer. For example, the system may detect certain terms that an enterprise prefers not to use for broadcasts, since they may convey confidential information about the enterprise (e.g., research and development information), or potentially offensive language that the enterprise does not wish to be associated with. The system will then generate a report of terms/phrases that have the potential of exposing confidential information and/or using offensive language, and will 1) point out the problematic language in a report and/or 2) directly make changes to the content that have the problematic language removed before being broadcast by the content general broadcaster 360.

In one embodiment of the present invention, selection of content received by computer 101 from content source 151 for broadcast (by content broadcaster 153) to the content receiver 155 (in use by the target audience/recipient) is achieved by a user of computer 101 activating a particular application found on a user interface (e.g., shown on display 109).

Figure 4:
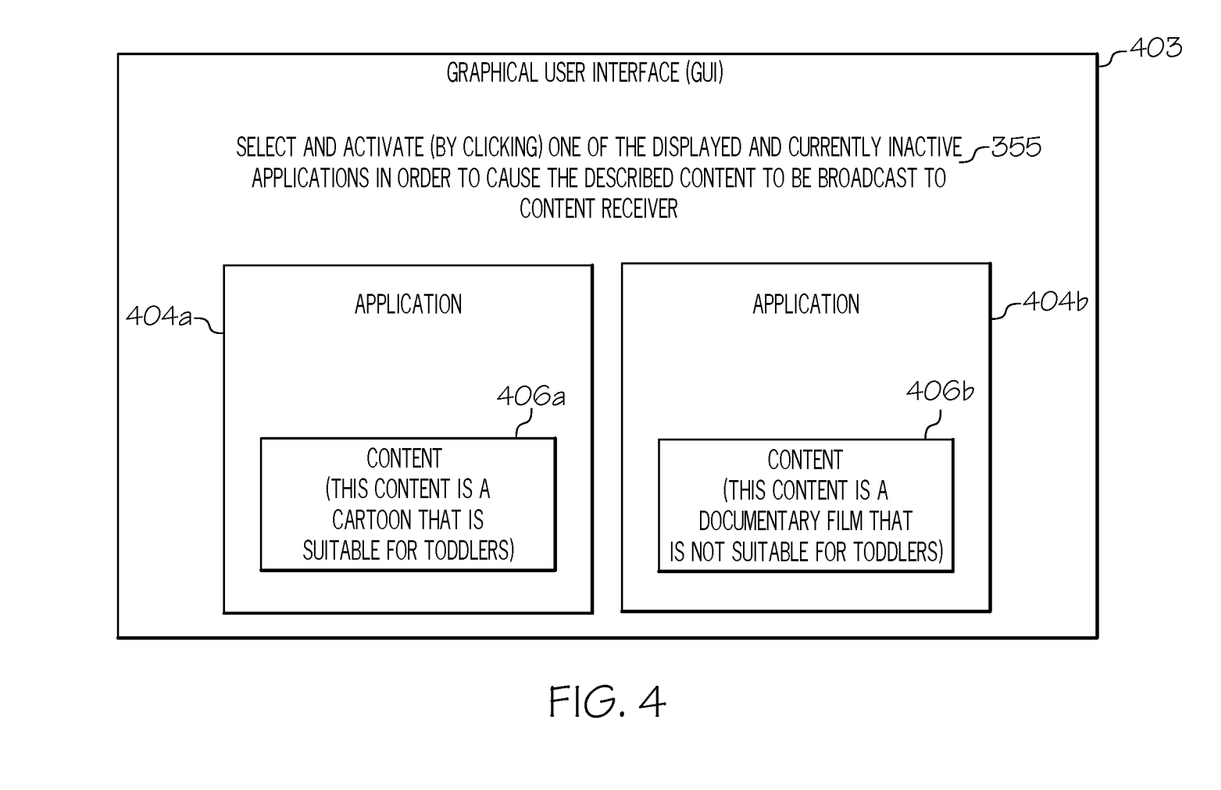
FIG. 4 depicts an exemplary graphical user interface (GUI) that allows a user of a client computer to activate an application that supplies a particular content for broadcast.

For example, consider now FIG. 4. As shown in FIG. 4, a graphical user interface (GUI) 403 on a display (e.g., display 109 shown in FIG. 1) displays two applications (application 404a and application 404b). Initially, both applications are in an unlaunchable state (i.e., are inactive until selected for activation by a user). However, associated with and displayed with application 404a is a description of content 406a, which is a cartoon that is suitable for viewing by a toddler. When application 404a is activated/launched (by the user clicking on the block showing application 404a), application 404a will 1) retrieve the content 406a and 2) send content 406a to the content receiver 155. For example, and in one embodiment of the present invention, application 404a is an application that, upon being selected by the user by clicking the box showing application 404a on GUI 403, 1) obtains an internet protocol (IP) and/or a media access control (MAC) address used by the content receiver 155 (e.g., from a lookup table that identifies the IP or MAC address used by that particular content receiver 155 that is used by a particular type of target audience such as a toddler or a particular user); 2) establishes a communication session between computer 101 and content receiver 155; and then 3) sends content 406a via the Internet from the computer 101 to the content receiver 155. If the user decides that he/she wants to send content that is appropriate for an older audience, then in one embodiment of the present invention application 404b is an application that, upon being selected by the user by clicking the box showing application 404b on GUI 403, 1) obtains an internet protocol (IP) and/or a media access control (MAC) address used by the content receiver 155 (e.g. through use of a lookup table); 2) establishes a communication session between computer 101 and content receiver 155; and then 3) sends content 406b via the Internet from the computer 101 to the content receiver 155. In another embodiment, application 404b uses another communication channel than that used by application 404a. For example, and in one embodiment of the present invention, application 404b is a wireless application that, upon being selected by the user by clicking the box showing application 404b on GUI 403, 1) obtains a cellular phone number used by the content receiver 155 (e.g., a "smart" phone); 2) establishes a telecommunication session between computer 101 and content receiver 155; and then 3) sends content 406b via the cellular network from the computer 101 to the content receiver 155.

Returning to FIG. 2, as shown in block 228, the appropriate content is thus sent to the target recipient, and the process ends at terminator block 230.

In one or more embodiments of the present invention, it is not necessary to process all kinds of filtering, enrichment and tagging stages (SSI, TI, GCI) for a smaller set of content. Furthermore, all kinds of users might not be interested in all kinds of violations, so they can set the threshold value of SSI, TI, GCI for notifications. Once SSI, TI and GCI values are generated, notifications (warnings/violations along with details on how to address the warnings/violations) are configured and shared with aligned stakeholders.

Figure 5:
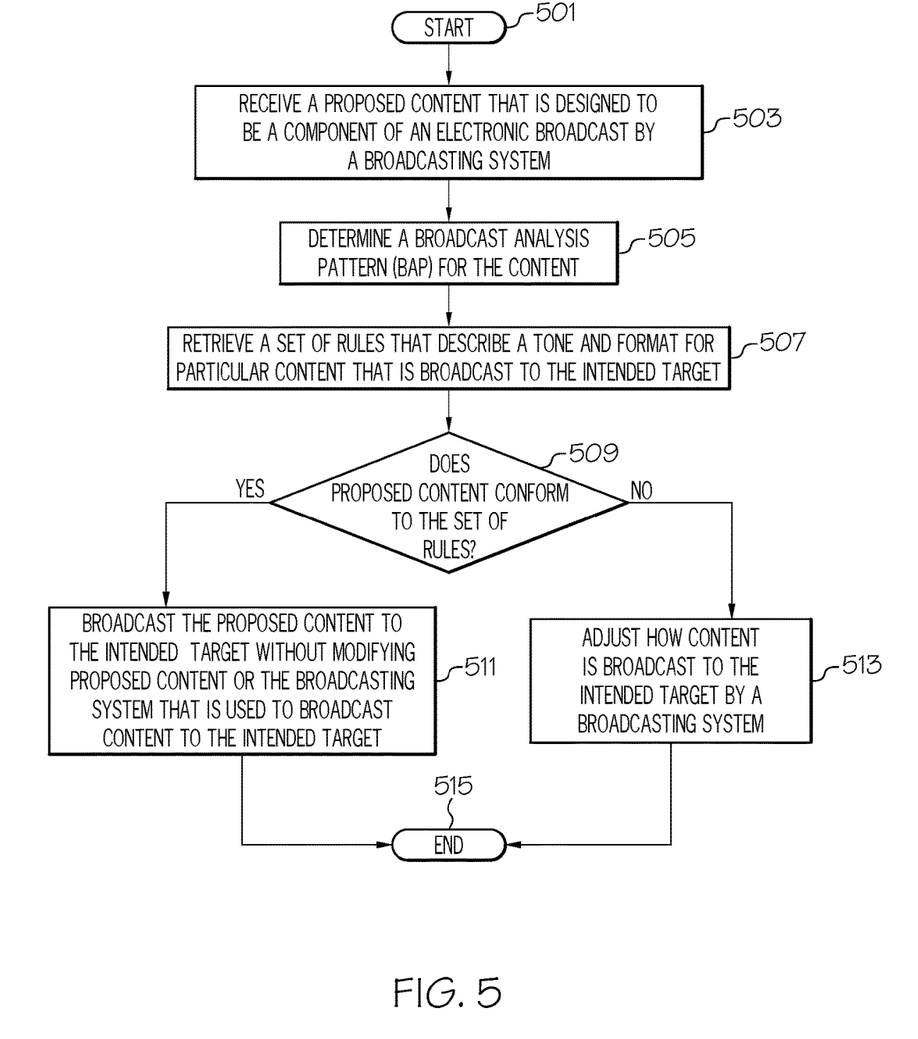
FIG. 5 is a high-level flow chart of one or more steps performed by one or more processors and/or other hardware devices in accordance with one or more embodiments of the present invention.

With reference now to FIG. 5, a high-level flow chart of one or more steps performed by one or more processors and/or other hardware devices in accordance with one or more embodiments of the present invention is presented.

After initiator block 501, one or more processors (e.g., processor 103 shown in FIG. 1) receive a proposed content (e.g., content 302b shown in FIG. 3) that is designed to be a component of an electronic broadcast by a broadcast system (e.g., content broadcaster 153 shown in FIG. 1), as described in block 503.

As described in block 505, the processor(s) determine a broadcast analysis pattern (BAP) for the content (see block 208 in FIG. 2 and the accompanying description presented herein). As described herein, the BAP describes the proposed content and an intended target of the electronic broadcast.

As described in block 507, the processor(s) retrieve a set of rules that describe a tone and format for particular content that is broadcast to the intended target. For example, in one embodiment the set of rules state that only content that is suitable for being broadcast to a toddler, based on the BAP, SSI, TI, and/or GCI metatags described herein, is to be broadcast to a content receiver that is being used by a toddler.

As described in block 509, a query is made, by the processor(s), as to whether the proposed content conforms to the set of rules (i.e., whether the BAP, SSI, TI, and/or GCI metatags meet the ranges/requirements of the set of rules in order for that proposed content to be sent to the intended target).

As described in block 511, if the proposed content conforms to the set of rules, then the proposed content is broadcast to the intended target without any modifications to the proposed content of the broadcasting system that broadcasts the proposed content.

However, and as described in block 513, in response to determining that the proposed content does not conform to the set of rules, the processor(s) adjust the broadcasting system, such that adjusting the broadcasting system modifies how content is broadcast to the intended target.

The flow chart ends at terminator block 515.

In an embodiment of the present invention, the proposed content is broadcast on a first sub-channel in the broadcasting system, and adjusting the broadcasting system includes the processor(s): modifying the proposed content into a modified content that conforms to the set of rules; disabling the first sub-channel in the broadcasting system; activating a second sub-channel in the broadcasting system; and transmitting the modified content on the second sub-channel to the intended target. That is (and as described in FIG. 3), content 302a is replaced with content 302b. In an embodiment of the present invention, this replacement content 302b is a modified version of content 302a. As described in FIG. 3, since content 302a is not appropriate for the user of content receiver 355, then the first sub-channel 305a is disabled (thus preventing content 302a from being sent to the content receiver 355, since sub-channel 305a has been reserved for transmitting content having the traits of content 302a). The second sub-channel 305b, which is reserved for transmitting content having the traits of content 302b, is then activated, thus allowing content 302b to be sent to content receiver 355.

As described in FIG. 4 and discussed herein, in an embodiment of the present invention adjusting the broadcasting system includes the processor(s): displaying a description of the proposed content on a user interface that displays a first application, where the proposed content is only capable of being transmitted by the first application, and where the first application is initially in a first unlaunchable state while being displayed on the user interface; modifying the proposed content into a modified content that conforms to the set of rules; displaying a description of the modified content on the user interface as the user interface displays a second application, where the modified content is only capable of being transmitted by the second application, and where the second application is initially in a second unlaunchable state while being displayed on the user interface; receiving a user selection of the second application; and executing the second application, such that executing the second application causes the modified content to be broadcast to the intended target.

As described in block 210 in FIG. 2, in an embodiment of the present invention the processor(s) enrich the modified content to form an enriched content, where the enriched content comprises metadata that describes an emotional tone of the modified content. That is, the system (using contextual analysis of the content) determines the tone (e.g., angry, sad, etc.) of the content, and generates metatags that describe this tone. These metatags are then appended to the content to form the enriched content.

As described in block 214 in FIG. 2, in an embodiment of the present invention the processor(s) analyze the enriched content to calculate a social sensitivity index (SSI) for the enriched content, where the SSI describes an emotional sensitivity of the intended target to content. The processor(s) then further modify how content is broadcast by the broadcasting system to the intended target based on the SSI of the enriched content. That is, the value of the SSI further causes the system to change channels (see FIG. 3), offer additional content options to the user (see FIG. 4), etc.

As described in block 218 of FIG. 2, the processor(s) analyze the enriched content to calculate a trustworthiness index (TI) for the enriched content, where the TI describes a level accuracy of information presented by the enriched content. The processor(s) then further modify how content is broadcast by the broadcasting system to the intended target based on the TI of the enriched content. That is, the value of the TI further causes the system to change channels (see FIG. 3), offer additional content options to the user (see FIG. 4), etc.

In an embodiment, the modified content (e.g., content 302b that has been selected by content selector device 303 shown in FIG. 3) is sent to content receiver 355, which is a "gatekeeper" for the final version of the modified content before it is sent to the content general broadcaster 350 for broadcast to the general public. In a further embodiment, before the modified content is sent to the content general broadcaster 350, the content receiver 355 transmits content 302b to a content modification device, which is a processor-based device that is capable of automatically modifying content based on content rules, as shown in block 365 in FIG. 3. For example, the content modification device may delete any potentially offensive terms, correct factual errors, etc. in the content. After making the changes to the content, the content modification device sends the further modified content to the content receiver, which then sends the further modified content to the content general broadcaster. The content general broadcaster then publicly broadcasts the further modified content.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). It In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
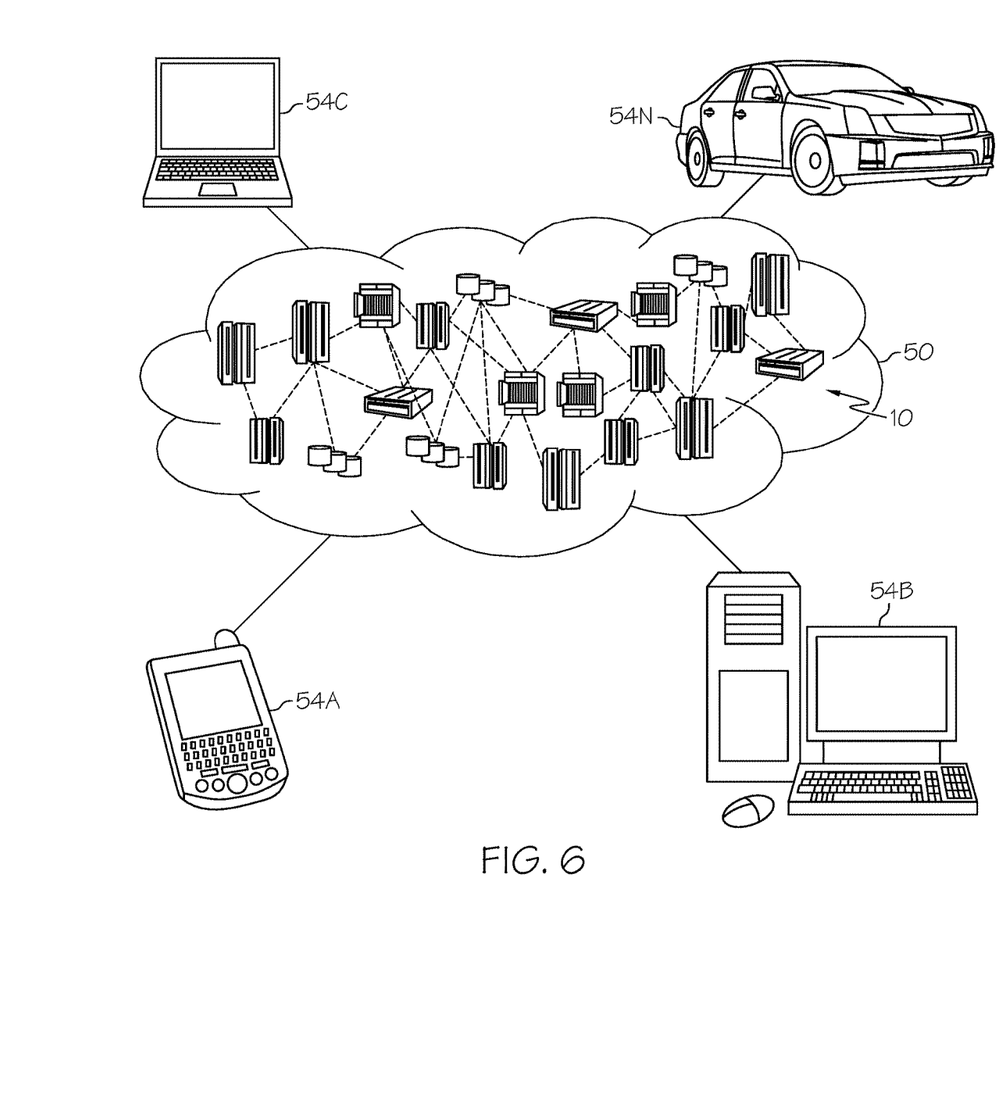
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
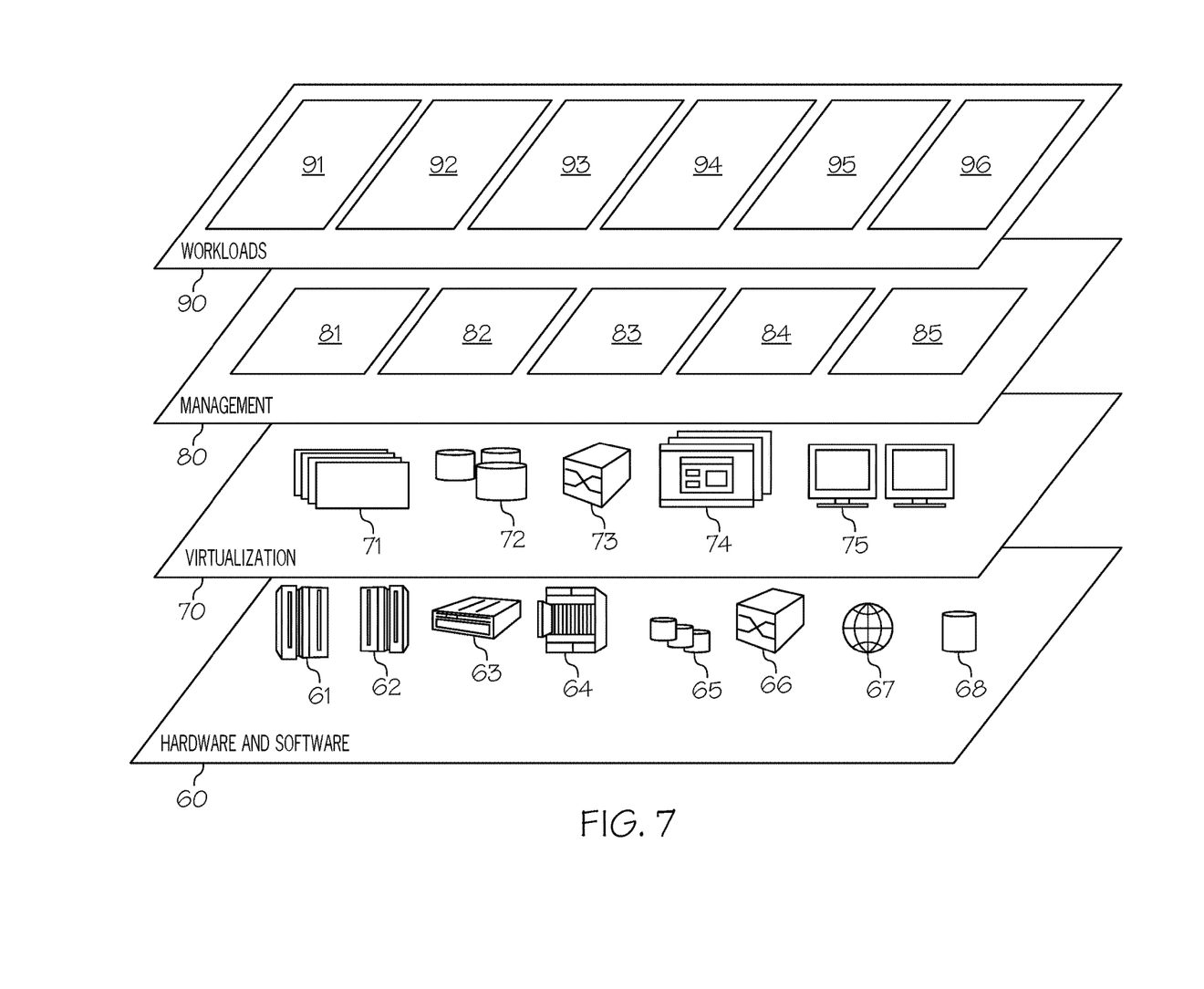
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and content selection and transmission control processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:

receiving, by one or more processors, a proposed content that is designed to be a component of an electronic broadcast by a broadcasting system;

determining, by one or more processors, a broadcast analysis pattern (BAP) for the proposed content, wherein the BAP describes the proposed content and an intended target of the electronic broadcast;

retrieving, by one or more processors, a set of rules that describe a tone and format for particular content that is broadcast to the intended target;

determining, by one or more processors, whether the proposed content conforms to the set of rules; and in response to determining that the proposed content does not conform to the set of rules, adjusting, by one or more processors, the broadcasting system, wherein adjusting the broadcasting system modifies how content is broadcast to the intended target, and wherein adjusting the broadcasting system further comprises:

displaying, by one or more processors, a description of the proposed content on a user interface that displays a first application, wherein the proposed content is only capable of being transmitted by the first application, and wherein the first application is initially in a first unlaunchable state while being displayed on the user interface;

modifying, by one or more processors, the proposed content into a modified content that conforms to the set of rules;

displaying, by one or more processors, a description of the modified content on the user interface as the user interface displays a second application, wherein the modified content is only capable of being transmitted by the second application, and wherein the second application is initially in a second unlaunchable state while being displayed on the user interface;

receiving, by one or more processors, a user selection of the second application; and executing, by one or more processors, the second application, wherein executing the second application causes the modified content to be broadcast to the intended target;

analyzing, by one or more processors, enriched content to calculate a trustworthiness index (TI) for the enriched content, wherein the TI describes a level of accuracy of information presented by the enriched content; and further modifying, by one or more processors, how content is broadcast by the broadcasting system to the intended target based on the TI of the enriched content.

2. The method of claim 1, wherein the proposed content is broadcast on a first sub-channel in the broadcasting system, and wherein adjusting the broadcasting system comprises:

modifying, by one or more processors, the proposed content into a modified content that conforms to the set of rules;

disabling, by one or more processors, the first sub-channel in the broadcasting system;

activating, by one or more processors, a second sub-channel in the broadcasting system; and transmitting, by one or more processors, the modified content on the second sub-channel to the intended target.

3. The method of claim 1, further comprising:

transmitting the modified content from the intended target to a content modification device, wherein the intended target is a content receiver that controls which content is publicly broadcast by a content general broadcaster, and wherein the content modification device automatically modifies content based on content rules;

receiving, by the content receiver, a further modified content from the content modification device;

transmitting, by the content receiver, the further modified content to the content general broadcaster; and publicly broadcasting, by the content general broadcaster, the further modified content.

4. A computer program product comprising a non-transitory computer readable storage device having program instructions embodied therewith, the program instructions readable and executable by a computer to perform a method comprising:

receiving a proposed content that is designed to be a component of an electronic broadcast by a broadcasting system;

determining a broadcast analysis pattern (BAP) for the proposed content, wherein the BAP describes the proposed content and an intended target of the electronic broadcast;

retrieving a set of rules that describe a tone and format for particular content that is broadcast to the intended target;

determining whether the proposed content conforms to the set of rules; and in response to determining that the proposed content does not conform to the set of rules, adjusting the broadcasting system, wherein adjusting the broadcasting system modifies how content is broadcast to the intended target and wherein adjusting the broadcasting system further comprises:

displaying a description of the proposed content on a user interface that displays a first application, wherein the proposed content is only capable of being transmitted by the first application, and wherein the first application is initially in a first unlaunchable state while being displayed on the user interface;

modifying the proposed content into a modified content that conforms to the set of rules;

displaying a description of the modified content on the user interface as the user interface displays a second application, wherein the modified content is only capable of being transmitted by the second application, and wherein the second application is initially in a second unlaunchable state while being displayed on the user interface;

receiving a user selection of the second application; and executing the second application, wherein executing the second application causes the modified content to be broadcast to the intended target;

analyzing enriched content to calculate a trustworthiness index (TI) for the enriched content, wherein the TI describes a level accuracy of information presented by the enriched content; and further modifying how content is broadcast by the broadcasting system to the intended target based on the TI of the enriched content.

5. The computer program product of claim 4, wherein the proposed content is broadcast on a first sub-channel in the broadcasting system, and wherein adjusting the broadcasting system comprises:

modifying the proposed content into a modified content that conforms to the set of rules;

disabling the first sub-channel in the broadcasting system;

activating a second sub-channel in the broadcasting system; and transmitting the modified content on the second sub-channel to the intended target.

6. The computer program product of claim 4, wherein the program instructions are provided as a service in a cloud environment.

7. A computer system comprising one or more processors, one or more computer readable memories, one or more computer readable storage mediums, and program instructions stored on at least one of the one or more computer readable storage mediums for execution by at least one of the one or more processors via at least one of the one or more computer readable memories to perform a method comprising:

receiving a proposed content that is designed to be a component of an electronic broadcast by a broadcasting system;

determining a broadcast analysis pattern (BAP) for the proposed content, wherein the BAP describes the proposed content and an intended target of the electronic broadcast;

retrieving a set of rules that describe a tone and format for particular content that is broadcast to the intended target;

determining whether the proposed content conforms to the set of rules; and in response to determining that the proposed content does not conform to the set of rules, adjusting the broadcasting system, wherein adjusting the broadcasting system modifies how content is broadcast to the intended target and wherein adjusting the broadcasting system further comprises:

displaying a description of the proposed content on a user interface that displays a first application, wherein the proposed content is only capable of being transmitted by the first application, and wherein the first application is initially in a first unlaunchable state while being displayed on the user interface;

modifying the proposed content into a modified content that conforms to the set of rules;

displaying a description of the modified content on the user interface as the user interface displays a second application, wherein the modified content is only capable of being transmitted by the second application, and wherein the second application is initially in a second unlaunchable state while being displayed on the user interface;

receiving a user selection of the second application; and executing the second application, wherein executing the second application causes the modified content to be broadcast to the intended target;

analyzing enriched content to calculate a trustworthiness index (TI) for the enriched content, wherein the TI describes a level accuracy of information presented by the enriched content; and further modifying how content is broadcast by the broadcasting system to the intended target based on the TI of the enriched content.

8. The computer system of claim 7, wherein the proposed content is broadcast on a first sub-channel in the broadcasting system, and wherein adjusting the broadcasting system comprises:

modifying the proposed content into a modified content that conforms to the set of rules;

disabling the first sub-channel in the broadcasting system;

activating a second sub-channel in the broadcasting system; and transmitting the modified content on the second sub-channel to the intended target.

9. The computer system of claim 7, wherein the program instructions are provided as a service in a cloud environment.

\* \* \* \* \*